United States Patent
Rincon-Torres et al.

(10) Patent No.: US 9,133,384 B2
(45) Date of Patent: Sep. 15, 2015

(54) CELLULOSE NANOWHISKERS IN WELL SERVICES

(75) Inventors: Marco Tulio Rincon-Torres, Aberdeen (GB); Lee J. Hall, Porter, TX (US)

(73) Assignee: Halliburton Energy Services, Inc., Houston, TX (US)

(*) Notice: Subject to any disclaimer, the term of this patent is extended or adjusted under 35 U.S.C. 154(b) by 436 days.

(21) Appl. No.: 13/561,158

(22) Filed: Jul. 30, 2012

(65) Prior Publication Data

US 2013/0196883 A1 Aug. 1, 2013

Related U.S. Application Data

(60) Provisional application No. 61/592,921, filed on Jan. 31, 2012.

(51) Int. Cl.
| | |
|---|---|
| *C09K 8/10* | (2006.01) |
| *C09K 8/60* | (2006.01) |
| *C09K 8/70* | (2006.01) |
| *C04B 28/02* | (2006.01) |
| *C04B 18/24* | (2006.01) |
| *C09K 8/467* | (2006.01) |

(52) U.S. Cl.
CPC . *C09K 8/10* (2013.01); *C04B 18/24* (2013.01); *C04B 28/02* (2013.01); *C09K 8/467* (2013.01); *C09K 8/70* (2013.01); *C09K 2208/10* (2013.01); *Y02W 30/97* (2015.05)

(58) Field of Classification Search
CPC ............ C09K 8/02; C09K 8/035; C09K 8/10; C09K 2208/08; C09K 2208/10
USPC .................................................. 507/112, 214
See application file for complete search history.

(56) References Cited

U.S. PATENT DOCUMENTS

| | | | |
|---|---|---|---|
| 4,440,649 A * | 4/1984 | Loftin et al. | ................... 507/121 |
| 5,350,528 A | 9/1994 | Westland et al. | |
| 5,362,713 A | 11/1994 | Westland et al. | |
| 6,348,436 B1 | 2/2002 | Langlois et al. | |
| 2008/0108772 A1 | 5/2008 | Oksman et al. | |
| 2013/0035263 A1 | 2/2013 | Laukkanen et al. | |

FOREIGN PATENT DOCUMENTS

WO  WO 2011089323 A1 * 7/2011

OTHER PUBLICATIONS

International Search Report, International Application No. PCT/US2013/024061, Date of mailing Jun. 14, 2013.
Habibi. "Cellulose Nanocrystals: Chemistry, Self-Assembly, and Applications" American Chemical Society 2010, Oct. 12, 2009,pp. 3479-3500.
D. Klemm, et al., Nanocelluloses: A New Family of Nature Based Materials, Angew. Chem. Int. Ed. 2011, 50, 5438-5466.

* cited by examiner

*Primary Examiner* — Aiqun Li
(74) *Attorney, Agent, or Firm* — Holly Soehnge; Baker Botts L.L.P.

(57) ABSTRACT

A method is provided for use in various well services, the method including the steps of: (a) forming or providing a well fluid comprising cellulose nanowhiskers; and (b) introducing the well fluid into a well. The method can be used, for example, for increasing the strength of a cement, for increasing the viscosity of a water-based well fluid, such as for a kill pill, a fracturing fluid, a gravel packing fluid.

21 Claims, No Drawings

CELLULOSE NANOWHISKERS IN WELL SERVICES

CROSS-REFERENCE TO RELATED APPLICATIONS

This application claims the benefit of U.S. Provisional Application No. 615929221 filed Jan. 31,2012.

TECHNICAL FIELD

The inventions are in the field of producing crude oil or natural gas from subterranean formations. More specifically, the inventions generally relate to well services including the use of cellulose nanowhiskers.

BACKGROUND ART

Oil & Gas Wells

In the context of production from a well, oil and gas are understood to refer to crude oil and natural gas. Oil and gas are naturally occurring hydrocarbons in certain subterranean formations.

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

To produce oil or gas, a well is drilled into a subterranean formation that is an oil or gas reservoir. Typically, a well must be drilled hundreds or thousands of feet into the earth to reach an oil or gas reservoir. Generally, the greater the depth of the formation, the higher the static temperature and pressure of the formation.

Generally, well services include a wide variety of operations that may be performed in oil, gas, geothermal, or water wells, such as drilling, cementing, completion, and intervention. These well services are designed to facilitate or enhance the production of desirable fluids such as oil or gas from or through a subterranean formation. A well service usually involves introducing a well fluid into a well.

Drilling and Drilling Fluids

In general, drilling is the process of drilling the wellbore. After the hole is drilled, sections of steel pipe, referred to as casing, which are slightly smaller in diameter than the borehole, are placed in at least the uppermost portions of the wellbore. The casing provides structural integrity to the newly drilled borehole.

The well is created by drilling a hole into the earth (or seabed) with a drilling rig that rotates a drill string with a drilling bit attached to the downward end. Usually the borehole is anywhere between about 5 inches (13 cm) to about 36 inches (91 cm) in diameter. The borehole usually is stepped down to a smaller diameter the deeper the wellbore as upper portions are cased or lined, which means that progressively smaller drilling strings and bits must be used to pass through the uphole casing or liner.

While drilling an oil or gas well, a drilling fluid is circulated downhole through a drillpipe to a drill bit at the downhole end, out through the drill bit into the wellbore, and then back uphole to the surface through the annular path between the tubular drillpipe and the borehole. The purpose of the drilling fluid is to maintain hydrostatic pressure in the wellbore, to lubricate the drill string, and to carry rock cuttings out from the wellbore.

The drilling fluid can be water-based or oil-based. Oil-based fluids tend to have better lubricating properties than water-based fluids, nevertheless, other factors can mitigate in favor of using a water-based drilling fluid.

In addition, the drilling fluid may be viscosified to help suspend and carry rock cuttings out from the wellbore. Rock cuttings can range in size from silt-sized particles to chunks measured in centimeters. Carrying capacity refers to the ability of a circulating drilling fluid to transport rock cuttings out of a wellbore. Other terms for carrying capacity include hole-cleaning capacity and cuttings lifting.

An example a water-based drilling fluid is a drilling mud, which includes an aqueous solution and undissolved solids (as solid suspensions). A water-based drilling mud can be based on a brine. Both the dissolved solids and the undissolved solids can be chosen to help increase the density of the drilling fluid. An example of an undissolved weighting agent is barite (barium sulfate). The density of a drilling mud can be much higher than that of typical seawater or even higher than high-density brines due to the presence of suspended solids.

Cementing and Hydraulic Cement Compositions

Cementing is a common well operation. For example, hydraulic cement compositions can be used in cementing operations in which a string of pipe, such as casing or liner, is cemented in a wellbore. The cement stabilizes the pipe in the wellbore and prevents undesirable migration of fluids along the wellbore between various zones of subterranean formations penetrated by the wellbore. Where the wellbore penetrates into a hydrocarbon-bearing zone of a subterranean formation, the casing can later be perforated to allow fluid communication between the zone and the wellbore. The cemented casing also enables subsequent or remedial separation or isolation of one or more production zones of the wellbore, for example, by using downhole tools such as packers or plugs, or by using other techniques, such as forming sand plugs or placing cement in the perforations. Hydraulic cement compositions can also be utilized in intervention operations, such as in plugging highly permeable zones or fractures in zones that may be producing too much water, plugging cracks or holes in pipe strings, and the like.

In performing cementing, a hydraulic cement composition is pumped as a fluid (typically in the form of suspension or slurry) into a desired location in the wellbore. For example, in cementing a casing or liner, the hydraulic cement composition is pumped into the annular space between the exterior surfaces of a pipe string and the borehole (that is, the wall of the wellbore). The cement composition is allowed time to set in the annular space, thereby forming an annular sheath of hardened, substantially impermeable cement. The hardened cement supports and positions the pipe string in the wellbore and bonds the exterior surfaces of the pipe string to the walls of the wellbore.

Hydraulic cement is a material that when mixed with water hardens or sets over time because of a chemical reaction with the water. Because this is a chemical reaction with the water, hydraulic cement is capable of setting even under water. The hydraulic cement, water, and any other components are mixed to form a hydraulic cement composition in the initial state of a slurry, which should be a fluid for a sufficient time before setting for pumping the composition into the wellbore and for placement in a desired downhole location in the well.

Completion or Intervention

After drilling and cementing the casing, completion is the process of making a well ready for production or injection. This principally involves preparing a zone of the wellbore to the required specifications, running in the production tubing and associated downhole equipment, as well as perforating and stimulating as required.

Intervention is any operation carried out on a well during or at the end of its productive life that alters the state of the well or well geometry, provides well diagnostics, or manages the production of the well. Workover can broadly refer to any kind of well intervention that involves invasive techniques, such as wireline, coiled tubing, or snubbing. More specifically, though, workover refers to the process of pulling and replacing a completion.

Common Well Treatments in Well Services

Well services can include various types of treatments that are commonly performed in a wellbore or subterranean formation.

For example, a treatment for fluid-loss control can be used during any of drilling, completion, and intervention operations. During completion or intervention, stimulation is a type of treatment performed to enhance or restore the productivity of oil or gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production, and controlling sand or fines production. Still other types of completion or intervention treatments include, but are not limited to, damage removal, formation isolation, wellbore cleanout, scale removal, and scale control. Of course, other well treatments and well fluids are known in the art.

Kill Pill Treatments

Fluids used during and after perforating a well during completion or intervention are usually referred to as "kill-pills." Kill-pills can be water-based or oil-based. A typical water-based kill-pill may consist of a brine that meets density requirements and one or more of the following: a xanthan polymer for viscosity control, a starch polymer for fluid loss control, and sized calcium carbonate for bridging at the pore throats. A typical oil-based kill-pill may consist of base oil, brine as an internal phase, an emulsifier package, barite or sized calcium carbonate to meet density and bridging requirements, lime and organophilic clay for alkalinity and viscosity, respectively. In addition fluid-loss control additives are also added in oil-based muds.

Hydraulic Fracturing

Hydraulic fracturing is a common stimulation treatment. The purpose of a fracturing treatment is to provide an improved flow path for oil or gas to flow from the hydrocarbon-bearing formation to the wellbore. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

Gravel Packing

Gravel packing is commonly used as a sand-control method to prevent production of formation sand or other fines from a poorly consolidated subterranean formation. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the fines are highly abrasive and can be damaging to pumping and oilfield other equipment and operations.

Placing a relatively larger particulate near the wellbore helps filter out the sand or fine particles and prevents them from flowing into the well with the produced fluids. The primary objective is to stabilize the formation while causing minimal impairment to well productivity.

The particulate used for this purpose is referred to as "gravel." In the oil and gas field, and as used herein, the term "gravel" is refers to relatively large particles in the sand size classification, that is, particles ranging in diameter from about 0.1 mm up to about 2 mm. Generally, a particulate having the properties, including chemical stability, of a low-strength proppant is used in gravel packing. An example of a commonly used gravel packing material is sand having an appropriate particulate size range.

In one common type of gravel packing, a mechanical screen is placed in the wellbore and the surrounding annulus is packed with a particulate of a larger specific size designed to prevent the passage of formation sand or other fines. It is also common, for example, to gravel pack after a fracturing procedure, and such a combined procedure is sometimes referred to as a "frac-packing."

Fluid-loss Control

Fluid loss refers to the undesirable leakage of a fluid phase of any type of well fluid into the permeable matrix of a zone, which zone may or may not be a treatment zone. Fluid-loss control refers to treatments designed to reduce such undesirable leakage. Providing effective fluid-loss control for well fluids during certain stages of well operations is usually highly desirable.

The usual approach to fluid-loss control is to substantially reduce the permeability of the matrix of the zone with a fluid-loss control material that blocks the permeability at or near the face of the rock matrix of the zone. For example, the fluid-loss control material may be a particulate that has a size selected to bridge and plug the pore throats of the matrix. All else being equal, the higher the concentration of the particulate, the faster bridging will occur. As the fluid phase carrying the fluid-loss control material leaks into the formation, the fluid-loss control material bridges the pore throats of the matrix of the formation and builds up on the surface of the borehole or fracture face or penetrates only a little into the matrix. The buildup of solid particulate or other fluid-loss control material on the walls of a wellbore or a fracture is referred to as a filter cake. Depending on the nature of a fluid phase and the filter cake, such a filter cake may help block the further loss of a fluid phase (referred to as a filtrate) into the subterranean formation. A fluid-loss control material is specifically designed to lower the volume of a filtrate that passes through a filter medium.

After application of a filter cake, however, it may be desirable to restore permeability into the formation. If the formation permeability of the desired producing zone is not restored, production levels from the formation can be significantly lower. Any filter cake or any solid or polymer filtration into the matrix of the zone resulting from a fluid-loss control treatment must be removed to restore the formation's permeability, preferably to at least its original level. This is often referred to as clean up.

A variety of fluid-loss control materials have been used and evaluated for fluid-loss control and clean-up, including foams, oil-soluble resins, acid-soluble solid particulates, graded salt slurries, linear viscoelastic polymers, and heavy metal-crosslinked polymers. Their respective comparative effects are well documented.

Fluid-loss control materials are sometimes used in drilling fluids or in treatments that have been developed to control fluid loss. A fluid-loss control pill is a treatment fluid that is designed or used to provide some degree of fluid-loss control. Through a combination of viscosity, solids bridging, and cake buildup on the porous rock, these pills oftentimes are able to substantially reduce the permeability of a zone of the subterranean formation to fluid loss. They also generally enhance filter-cake buildup on the face of the formation to inhibit fluid flow into the formation from the wellbore.

Increasing Viscosity of a Well Fluid

"Carrier" Fluid for Particulate

Increasing the viscosity of a well fluid can be useful for several purposes.

For example, during drilling, rock cuttings should be carried uphole by the drilling fluid and flowed out of the wellbore. The rock cuttings typically have specific gravity greater than 2, which is much higher than that of many drilling fluids. These high-density cuttings have a tendency to separate from water or oil very rapidly.

Similarly, a proppant used in fracturing or a gravel used in gravel packing may have a much different density than the carrier fluid. For example, sand has a specific gravity of about 2.7, whereas water has a specific gravity of 1.0 at Standard Laboratory conditions of temperature and pressure. A proppant or gravel having a different density than water will tend to separate from water very rapidly.

As many well fluids are water-based, partly for the purpose of helping to suspend particulate of higher density, and for other reasons known in the art, the density of the fluid used in a well can be increased by including highly water-soluble salts in the water, such as potassium chloride. However, increasing the density of a well fluid will rarely be sufficient or effective to match the density of the particulate.

Increasing Viscosity of Fluid for Suspending Particulate

Increasing the viscosity of a well fluid can help prevent a particulate having a different specific gravity than an external phase of the fluid from quickly separating out of the external phase.

A viscosity-increasing agent can be used to increase the ability of a fluid to suspend and carry a particulate material in a well fluid. A viscosity-increasing agent can be used for other purposes, such as matrix diversion or conformance control.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents and related techniques for increasing the viscosity of a fluid.

In general, because of the high volume of fracturing fluid typically used in a fracturing operation, it is desirable to efficiently increase the viscosity of fracturing fluids to the desired viscosity using as little viscosity-increasing agent as possible. In addition, relatively inexpensive materials are preferred. Being able to use only a small concentration of the viscosity-increasing agent requires a lesser amount of the viscosity-increasing agent in order to achieve the desired fluid viscosity in a large volume of fracturing fluid.

Polymers for Increasing Viscosity

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Crosslinking of Polymer to Increase Viscosity of a Fluid or Form a Gel

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polysaccharide may form a gel with water. Gel formation is based on a number of factors including the particular polymer and concentration thereof, the particular crosslinker and concentration thereof, the degree of crosslinking, temperature, and a variety of other factors known to those of ordinary skill in the art.

For example, one of the most common viscosity-increasing agents used in the oil and gas industry is guar. A mixture of guar dissolved in water forms a base gel, and a suitable crosslinking agent can be added to form a much more viscous fluid, which is then called a crosslinked fluid. The viscosity of base gels of guar is typically about 20 to about 50 cp. When a base gel is crosslinked, the viscosity is increased by 2 to 100 times depending on the temperature, the type of viscosity testing equipment and method, and the type of crosslinker used.

The degree of crosslinking depends on the type of viscosity-increasing polymer used, the type of crosslinker, concentrations, temperature of the fluid, etc. Shear is usually required to mix the base gel and the crosslinking agent. Thus, the actual number of crosslinks that are possible and that actually form also depends on the shear level of the system. The exact number of crosslink sites is not well known, but it could be as few as one to about ten per polymer molecule. The number of crosslinks is believed to significantly alter fluid viscosity.

For a polymeric viscosity-increasing agent, any crosslinking agent that is suitable for crosslinking the chosen monomers or polymers may be used.

Problem with Certain Hydratable Agents and Certain Dissolved Ions in Water

Most, if not all, of the commonly used water-soluble viscosity-increasing agents, water-soluble friction-reducing agents, and water-soluble elasticity-increasing agents are hydratable. As referred to herein, "hydratable" means capable of being hydrated by contacting the hydratable agent with water. Regarding a hydratable agent that comprises a polymer, this means, among other things, to associate sites on the polymer with water molecules and to unravel and extend the polymer chain in the water. Viscosity-increasing agents have been conventionally hydrated directly in the water at the concentration to be used for the well fluid.

A common problem with using hydratable agents is that many of the commonly-used hydratable polymers used for such purposes are sensitive to dissolved ions in the water. The hydratable agents are often especially sensitive to divalent cations such as calcium and magnesium. For example, divalent cations such as calcium and magnesium may inhibit and slow the time required for hydration of certain types of polymers commonly used for such purposes. In the context of hydratable polymers, a water having total dissolved solids of more than 0.67 lb/gal (80 g/l), such that the density of the water with the total dissolved solids is more than 9.0 lb/gal, is generally considered too high for many types of hydratable polymers. Some hydratable polymers may be sensitive to lower concentrations of TDS.

Problem with Fluid Damage to Proppant Pack or Matrix Permeability

In well treatments using viscous well fluids, the material for increasing the viscosity of the fluid can damage the permeability of the proppant pack or the matrix of the subterranean formation. For example, a fracturing fluid can include a polymeric material that is deposited in the fracture or within the matrix. By way of another example, the fluid may include surfactants that leave unbroken micelles in the fracture or change the wettability of the formation in the region of the fracture.

Breakers are utilized in many treatments to mitigate fluid damage in the formation. However, breakers and other treatments are subject to variability of results, they add expense and complication to a fracture treatment, and in can still leave at least some fluid damage in the formation.

Breaker for Viscosity of Fluid with Polysaccharide or Crosslinked Polysaccharide After a treatment fluid is placed where desired in the well and for the desired time, the fluid usually must be removed from the wellbore or the formation. For example, in the case of hydraulic fracturing, the fluid should be removed leaving the proppant in the fracture and without damaging the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack.

Reducing the viscosity of a viscosified fluid is referred to as "breaking" the fluid. Chemicals used to reduce the viscosity of fracturing fluids are called breakers. Other types of viscosified well fluids also need to be broken for removal from the wellbore or subterranean formation.

No particular mechanism is necessarily implied by the term. For example, a breaker can reduce the molecular weight of a water-soluble polymer by cutting the long polymer chain. As the length of the polymer chain is cut, the viscosity of the fluid is reduced. For instance, reducing the guar polymer molecular weight to shorter chains having a molecular weight of about 10,000 converts the fluid to near water-thin viscosity. This process can occur independently of any crosslinking bonds existing between polymer chains.

In the case of a crosslinked viscosity-increasing agent, for example, one way to diminish the viscosity is by breaking the crosslinks. For example, the borate crosslinks in a borate-crosslinked polymer can be broken by lowering the pH of the fluid. At a pH above 8, the borate ion exists and is available to crosslink and cause an increase in viscosity or gelling. At a lower pH, the borate ion reacts with proton and is not available for crosslinking, thus, an increase in viscosity due to borate crosslinking is reversible. In contrast, crosslinks formed by zirconium, titanium, antimony, and aluminum compounds, however, are such crosslinks are considered to be non-reversible and are broken by other methods than controlling pH.

Thus, removal of the treatment fluid is facilitated by using one or more breakers to reduce fluid viscosity.

Unfortunately, another complicating factor exists. Because of the large size of the polymer, a filtration process can occur upon the face of a formation or fracture in conventional formation. A filtercake of the polymer can be formed while the aqueous fluid, KCl, and breakers pass into the matrix of the formation. Careful examination of this filtercake, which may be formed from crosslinked or uncrosslinked guar or other polymer, reveals a semi-elastic, rubberlike membrane. Once the polymer concentrates, it is difficult to solubilize the polymer. Nonfiltercake fluid consists of approximately 99.5 percent water and 0.5 percent polymer. Accordingly, for example, when the fracture closes in a fracturing treatment, the permeability of the proppant bed or the formation face may be severely damaged by the polymer filtercake. Viscosified gravel pack fluids need breakers, too. They may or may not form a filtercake on the formation face.

Breakers must be selected to meet the needs of each situation. First, it is important to understand the general performance criteria of breakers. In reducing the viscosity of the treatment fluid to a near water-thin state, the breaker must maintain a critical balance. Premature reduction of viscosity during the pumping of a treatment fluid can jeopardize the treatment. Inadequate reduction of fluid viscosity after pumping can also reduce production if the required conductivity is not obtained.

In fracturing, for example, the ideal viscosity versus time profile would be if a fluid maintained 100% viscosity until the fracture closed on proppant and then immediately broke to a thin fluid. Some breaking inherently occurs during the 0.5 to 4 hours required to pump most fracturing treatments. One guideline for selecting an acceptable breaker design is that at least 50% of the fluid viscosity should be maintained at the end of the pumping time. This guideline may be adjusted according to job time, desired fracture length, and required fluid viscosity at reservoir temperature. A typical gravel pack break criteria is a minimum 4-hour break time.

Chemical breakers used to reduce viscosity of a fluid viscosified with a viscosifying polymer used in fracturing or other subterranean applications are generally grouped into three classes: oxidizers, enzymes, and acids.

SUMMARY OF THE INVENTION

According to an embodiment, a method is provided for use in various well services, the method including the steps of:
(a) forming or providing a well fluid including cellulose nanowhiskers; and
(b) introducing the well fluid into a well.

According to another embodiment, a method is provided for use in various well services, the method including the steps of:

(a) forming or providing a water-based well fluid including:
  (i) water; and
  (ii) cellulose nanowhiskers; and
(b) introducing the water-based well fluid into a well.

The methods can be used, for example, for increasing the strength of a cement, for increasing the viscosity of a water-based well fluid, such as for a kill pill, a fracturing fluid, a gravel packing fluid.

These and other embodiments and aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION OF PRESENTLY PREFERRED EMBODIMENTS AND BEST MODE

Interpretation and Definitions

General Interpretation

The words or terms used herein have their plain, ordinary meaning in the field of this disclosure, except to the extent explicitly and clearly defined in this disclosure.

If there is any conflict in the definitions or usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Terms such as "first," "second," "third," etc. are assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there by any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Well Terms

A subterranean formation is a body of rock that has sufficiently distinctive characteristics and is sufficiently continuous for geologists to describe, map, and name it.

A subterranean formation having a sufficient porosity and permeability to store and transmit fluids is sometimes referred to as a reservoir.

A "well" includes a wellhead and at least one wellbore from the wellhead penetrating the earth. The "wellhead" is the surface termination of a wellbore, which surface may be on land or on a seabed. A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well. The "borehole" usually refers to the inside wellbore wall, that is, the rock face or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

As used herein, a "well fluid" broadly refers to any fluid adapted to be introduced into a well for any purpose. A well fluid can be, for example, a drilling fluid, a cementing composition, a treatment fluid, or a spacer fluid. If a well fluid is to be used in a relatively small volume, for example less than about 200 barrels (32 m$^3$), it is sometimes referred to in the art as a wash, dump, slug, or pill.

As used herein, the word "treatment" refers to any treatment for changing a condition of a portion of a wellbore or an adjacent subterranean formation; however, the word "treatment" does not necessarily imply any particular treatment purpose. A treatment usually involves introducing a well fluid for the treatment, in which case it may be referred to as a treatment fluid, into a well. As used herein, a "treatment fluid" is a fluid used in a treatment. Unless the context otherwise requires, the word "treatment" in the term "treatment fluid" does not necessarily imply any particular treatment or action by the fluid.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." As used herein, a "treatment zone" refers to an interval of rock along a wellbore into which a well fluid is directed to flow from the wellbore.

As used herein, introducing "into a well" means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone. As used herein, "into a treatment zone" means into and through the wellhead and, additionally, through the wellbore and into the treatment zone.

The term "design temperature" refers to an estimate or measurement of the actual temperature at the down hole environment at the time of the treatment. That is, design temperature takes into account not only the bottom hole static temperature ("BHST"), but also the effect of the temperature of the well fluid on the BHST during treatment. Because well fluids may be considerably cooler than BHST, the difference between the two temperatures can be quite large. Ultimately, if left undisturbed, a subterranean formation will return to the BHST.

Fluid Terms

The physical state or phase of a substance (or mixture of substances) and other physical properties are determined at a temperature of 77° F. (25° C.) and a pressure of 1 atmosphere (Standard Laboratory Conditions) without any applied shear.

As used herein, a "fluid" is a substance that behaves as a fluid under standard laboratory conditions, that is, at 77° F. (25° C.) temperature and 1 atmosphere pressure, and at the higher temperatures and pressures usually occurring in subterranean formations without any applied shear.

Every fluid inherently has at least a continuous phase. A fluid can have more than one phase. The continuous phase of a well fluid is a liquid under standard laboratory conditions. For example, a well fluid can in the form of be a suspension (solid particles dispersed in a liquid phase), an emulsion (liquid particles dispersed in another liquid phase), or a foam (a gas phase dispersed in liquid phase).

As used herein, a "water-based" means that water or an aqueous solution is the continuous phase of the substance.

In contrast, "oil-based" means that oil is the continuous phase of the substance. In this context, the oil of an oil-based fluid can be any oil. In general, an oil is any substance that is liquid standard laboratory conditions, is hydrophobic, and soluble in organic solvents. Oils have a high carbon and hydrogen content and are relatively non-polar substances, for example, having a polarity of 3 or less on the Synder polarity index. This general definition includes classes such as petrochemical oils, vegetable oils, and many organic solvents. All oils can be traced back to organic sources.

Solubility Terms

A substance is considered to be "soluble" in a liquid if at least 10 grams of the substance can be dissolved in one liter of the liquid when tested at 77° F. and 1 atmosphere pressure for 2 hours and considered to be "insoluble" if less soluble than this.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

Viscosity and Gel Terms

Unless otherwise specified, the apparent viscosity of a fluid (excluding any suspended solid particulate larger than silt) is measured with a Fann Model 50 type viscometer using an R1 rotor, B1 bob, and F1 torsion spring at a shear rate of 40 1/s, and at a temperature of 77° F. (25° C.) and a pressure of 1 atmosphere. For reference, the viscosity of pure water is about 1 cP.

A fluid is considered to be "pumpable" if it has an apparent viscosity less than 5,000 cP (independent of any gel characteristic), or, if a cementing composition, it has not yet thickened.

As used herein, a fluid is considered to be "viscous" if it has an apparent viscosity of 10 cP or higher. The viscosity of a viscous fluid is considered to break or be broken if the viscosity is reduced to 3 cP or lower.

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

The physical state of a gel is formed by a network of interconnected molecules, such as a crosslinked polymer or a network of micelles. The network gives a gel phase its structure and an apparent yield point. At the molecular level, a gel is a dispersion in which both the network of molecules is continuous and the liquid is continuous. A gel phase is sometimes considered as a single physical state or phase.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

Particulate Terms

As used herein, "particulate" or "particulate material" refers to matter in the physical form of distinct particles. A particulate is a grouping of particles based on common characteristics, including chemical composition and particle size range, particle size distribution, or median particle size. As used herein, a particulate is a grouping of particles having similar chemical composition and particle size ranges anywhere in the range of about 1 micrometer (e.g., microscopic clay or silt particles) to about 3 millimeters (e.g., large grains of sand).

A particulate will have a particle size distribution ("PSD"). As used herein, "the size" of a particulate can be determined by methods known to persons skilled in the art.

A particulate can be of solid or liquid particles. As used herein, however, unless the context otherwise requires, "particulate" refers to a solid particulate.

Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of the continuous phase of the fluid without the weight of any viscosity-increasing agent, dissolved salt, suspended particulate, or other materials or additives that may be present in the water.

Any doubt regarding whether units are in U.S. or Imperial units, where there is any difference, U.S. units are intended. For example, "gal/Mgal" means U.S. gallons per thousand U.S. gallons.

The micrometer (μm) may sometimes referred to herein as a micron.

Cellulose Nanowhiskers

Cellulose is the world's most abundant biopolymer on earth. It is natural, renewable, and biodegradable. It is naturally synthesized by plants as well as by some specialized bacteria. Its molecular structure is constituted by a linear backbone of β-1, 4-O-glycosyl linked D-glucose residues bundled up in a microfiber. The cellulose microfiber varies in length depending on the cellulose species.

Once synthesized, the cellulose microfiber contains a crystalline part, which is highly insoluble in water, and some non-crystalline parts, which have been referred to as amorphous cellulose. The crystalline cellulose is able to make a strong network, which is believed to be based on inter-molecular hydrogen-bonding. However, in its most common natural state, cellulose microfibers show an amorphous region. The amorphous region of the cellulose microfibers allows for water to penetrate.

Cellulose nanowhiskers, which are sometimes also referred to as nanocrystalline cellulose, can be produced from natural cellulose by partial acid hydrolysis (e.g., with strong acids such as $H_2SO_4$ or HCl), which targets only the amorphous cellulose to render only crystalline, non-woven, cellulose microfibers, also known as cellulose nanowhiskers. The length of the nanowhiskers varies in the range from about 100 nanometers to about one micron (1,000 nm). The width of the nanowhiskers varies the range of about 30 nm to about 50 nm.

Being readily abundant and relatively inexpensive to produce, cellulose nanowhiskers are expected to be an economically favorable alternative to carbon nanotubes. Furthermore, cellulose is a biodegradable material, so there are no environmental issues that could restrict their use in oil or gas wells.

The mechanical properties of cellulose nanowhiskers are much stronger than that of unprocessed cellulose.

It is believed cellulose nanowhiskers would, adopt a uniaxial distribution when subjected to a shear field, which would be useful in applications for well services and fluids. Such a response to a shear field would provide good rheological properties in well fluids, including, for example, a viscosifying effect with thixotropic behavior. It is believed these rheological properties would be achievable in brine systems, including formate brine systems, whereas such brine systems interfere with conventional polymers for viscosifying well fluids.

The temperature stability of cellulose nanowhiskers prepared by hydrolysis using H2SO4 is known to be up to about 350° F. This limited thermal stability is believed to be in part as the deleterious effect of charged $R-SO_4-$ groups on the surface of the nanowhiskers. It is believed that when cellulose nanowhiskers are prepared using HCl, leaving no sulfate residues on the surface of the nanowhiskers, the thermal stability could be further enhanced. Thus, it is believed the nanowhiskers prepared using HCl acid hydrolysis can be utilized in well applications at much higher design temperatures, for example, at temperatures greater than 350° F.

The presence of hydroxyl groups on the surface of the nanowhiskers makes this material amenable for a variety of chemically substituted with an organic compound or grafted with a polymer. It is possible, thus, to make organic substitutions that would allow the nanowhiskers to be cross-linked., For example, selective oxidation of the primary alcohol ($R-CH_3-OH$) group on the cellulose surface to the carboxylic acid ($R-COOH$) could be used to couple to amine groups ($R-NH_2$) attached to other chemical additives, forming a bridge covalent bond (an amide bond). In another example, two nearby carboxyl groups could be treated with a base to form carboxylate anions ($R-COO-$) which in turn could be ionically bridged by a divalent cation such as $Ca^{2+}$ or $Mg^{2+}$. Such a polymer network bridged by electrostatic forces would allow the nanowhiskers to be cross-linked when exposed to a change in certain critical conditions. For certain applications in well services, the ionic cross-linking mechanism can be adapted to be reversible so that it can be switched off on demand (e.g., by the addition of acid to change pH or switching from divalent to monovalent brine) to break the viscosity of the well fluid.

Chemical functionalization of the material can be used to optimize the properties in various well fluid applications, including for oil-based fluids such as drilling fluids and for water or oil-based emulsions. For example, the addition of a phenyl substituent ($R-C_6H_5$) or long chain alkyl group ($R-(CH_2)n-CH_3$) at any of the hydroxyl positions on the cellulose backbone would result in improved nanowhisker dispersibility in oil-based systems.

Well Service Applications

Well fluids containing cellulose nanowhiskers can be used in various well services, including in drilling, cementing, completion, and intervention.

According to an embodiment, a method is provided for use in various well services, the method including the steps of:

(a) forming or providing a well fluid including cellulose nanowhiskers; and (b) introducing the well fluid into a well.

According to another embodiment, a method is provided for use in various well services, the method including the steps of:

(a) forming or providing a water-based well fluid including:

(i) water; and (ii) cellulose nanowhiskers; and (b) introducing the water-based well fluid into a well.

The methods can be used, for example, for increasing the strength of a cement, for increasing the viscosity of a water-based well fluid, such as for a kill pill, a fracturing fluid, a gravel packing fluid.

For example, cellulose whiskers can be used as an additive for a well fluid to help remedy lost-circulation.

In addition, the outstanding mechanical properties exhibited by cellulose nanowhiskers can also be used in cementing applications. It is believed they would be a cement reinforcement and enhanced strength additive. Depending on the process of preparing, it is believed they would also have high temperature stability, for example, above 350° F.

Cellulose nanowhiskers can be used for a kill pill. Preferably, the kill pill does not include any larger solid particulates. Depending on the process of preparing, it is believed cellulose nanowhiskers would provide a solid-less kill-pill that is stable to design temperatures up to at least 350° F. Due to its extremely small size and biodegradability, the cellulose nanowhiskers are expected to have little impact on the permeability of a subterranean formation. In other words, they would not damage the permeability of the formation.

A cross-linkable nanocomposite structure formed from cellulose nanowhiskers can be use as a fracturing fluid. Depending on the process of preparing, it is believed they would also be useful for applications that require high temperatures, e.g., above 350° F.

In any of these applications, the cellulose nanowhiskers would be considered as having good biodegradability.

Distinctive Characteristics

Cellulose nanowhiskers can be used as a temperature resistant (>350° F.) biopolymer for viscosifying a wide variety of well fluids.

Because the product is not very soluble or is insoluble in aqueous solution, and the ability to produce viscosity is via hydrogen-bonding interactions (similar to a clay system), the cellulose whiskers can be used in water or aqueous systems such as saturated cesium formate brine. Since the product can align uniaxially in the shear field it is expected to show high thixotropic behavior, but at the same time to show good suspension properties when static.

Biopolymers currently used in kill pills and fracturing fluids have a relatively narrow temperature window for application. Cellulose nanowhiskers have a wider and higher temperature range of application than conventional biopolymers.

Cellulose nanowhiskers offer a high strength, low density, thermally stable, biodegradable, nanocomposite material that can be used to enhance cement properties in well servicing applications.

The raw material is readily available and the process to produce nanowhiskers is relatively inexpensive. The product is expected to reach a price much less than carbon nano-tubes. Furthermore, the toxicity level is also expected to be much less than carbon nanotubes.

Embodiments According to the Invention

Cellulose Nanowhiskers

According to an embodiment, the cellulose nanowhiskers have a temperature stability of at least 350° F. and the design temperature of the step of introducing is not greater than the temperature stability of the nanowhiskers.

According to another embodiment, the cellulose nanowhiskers have a temperature stability of at least 350° F. and the design temperature of the step of introducing is not greater than the temperature stability of the nanowhiskers.

Any sufficiently strong acid can be used to prepare the nanowhiskers. In an embodiment, the cellulose nanowhiskers are prepared using less than the concentration of $H_2SO_4$ that would have a deleterious effect on the thermal stability of the cellulose nanowhiskers compared to cellulose nanowhiskers prepared using HCl. Preferably, the cellulose nanowhiskers are prepared using HCl.

Continuous Aqueous Phase

According to the invention, the well fluid is preferably a water-based fluid.

In some embodiments, the aqueous phase, including the dissolved materials therein, may be present in the well fluids suitable for use in the present invention in an amount in the range from about 5% to 100% by volume of the well fluid.

Preferably, the water for use in the well fluid does not contain anything that would adversely interact with the other components used in accordance with this invention or with the subterranean formation.

In some embodiments, the aqueous phase can include freshwater or non-freshwater. Non-freshwater sources of water can include surface water ranging from brackish water to seawater, brine, returned water (sometimes referred to as flowback water) from the delivery of a well fluid into a well, unused well fluid, and produced water. As used herein, brine refers to water having at least 40,000 mg/L total dissolved solids.

In some embodiments, the aqueous phase of the well fluid may comprise a brine. The brine chosen should be compatible with the formation and should have a sufficient density to provide the appropriate degree of well control.

Salts may optionally be included in the well fluids of the present invention for many purposes. For example, salts may be added to a water source, for example, to provide a brine, and a resulting well fluid, having a desired density. Salts may optionally be included for reasons related to compatibility of the well fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a well fluid suitable for use in the present invention.

Suitable salts can include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, e.g., the temperature at which the salt precipitates from the brine as the temperature drops.

Well Fluid Additives

A well fluid can contain additives that are commonly used in oil field applications, as known to those skilled in the art. These include, but are not necessarily limited to, brines, inorganic water-soluble salts, salt substitutes (such as trimethyl ammonium chloride), pH control additives, surfactants, crosslinkers, breakers, breaker aids, oxygen scavengers, alcohols, scale inhibitors, corrosion inhibitors, hydrate inhibitors, fluid-loss control additives, oxidizers, chelating agents, water control agents (such as relative permeability modifiers), consolidating agents, proppant flowback control agents, conductivity enhancing agents, clay stabilizers, sulfide scavengers, fibers, bactericides, and combinations thereof.

Well Fluid without Larger Solid Particulate

In an embodiment, the water-based well fluid does not include solid particulate larger than the cellulose nanowhiskers.

Step of Forming or Providing the Well Fluid

Preferably, the step of forming or providing the water-based well fluid is performed at the well site of the well.

The step of forming or providing a water-based well fluid can include, for example, the steps of:
 (a) forming or providing a first fluid comprising:
  (i) water; and
  (ii) cellulose nanowhiskers;
 (b) forming or providing the water-based well fluid including the first fluid.

For example, the step of forming or providing the water-based well fluid including the first fluid is performed at the well site of the well. It should be understood that the first fluid can be formed away from the well site and brought to the well site for use in a well fluid in the well.

In certain embodiments, the preparation of well fluids can be performed at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Step of Introducing Into a Well or Treatment Zone

The step of delivering a well fluid into a well is preferably within a relatively short period after forming the well fluid, e.g., less within 30 minutes to one hour. More preferably, the step of delivering the well fluid is immediately after the step of forming the well fluid, which is "on the fly." It should be understood that the step of delivering the well fluid into the wellbore can advantageously include the use of one or more fluid pumps.

The well fluid may be provided and introduced into the subterranean formation in certain embodiments of the present invention by any means known in the art. In certain embodiments, the well fluid may be introduced into the subterranean formation by pumping the well fluid into a well bore that penetrates a portion of the subterranean formation.

Fracturing Treatment

In certain embodiments (e.g., fracturing operations), the well fluid may be introduced into the subterranean formation at or above a pressure sufficient to create or enhance one or more fractures in a portion of the subterranean formation. In an embodiment, the step of introducing comprises introducing under conditions for fracturing a treatment zone. The fluid is introduced into the treatment zone at a rate and pressure that are at least sufficient to fracture the zone.

Non-fracturing Well Service

In an embodiment, the step of introducing is at a rate and pressure below the fracture pressure of the treatment zone. In an embodiment, the step of introducing comprises introducing under conditions for gravel packing the treatment zone. In another embodiment, the water-based well fluid is adapted and the step of introducing is under conditions adapted for use in stabilizing the wellbore and controlling fluid loss to the formation or fluid invasion from the formation.

Optional Step of Allowing Time for Curing a Cement Composition or Breaking

In certain embodiments, the methods can include allowing time a well fluid that is a cementing composition to set in the well. In other embodiments, the methods can include allowing time for a viscosified well fluid that has increased viscosity due to the temporary crosslinking of cellulose nanowhiskers to break in the well.

Step of Producing Hydrocarbon from Subterranean Formation

Preferably, after the step of introducing the well fluid, the method includes a step of producing hydrocarbon from the subterranean formation.

Conclusion

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method comprising the steps of:
   (a) forming or providing a well fluid including cellulose nanowhiskers; and
   (b) introducing the well fluid into a well.

2. A method comprising the steps of:
   (a) forming or providing a water-based well fluid comprising:
      (i) water; and
      (ii) cellulose nanowhiskers; and
   (b) introducing the water-based well fluid into a well.

3. The method according to claim 2, wherein the step of forming or providing a the water-based well fluid is performed at the well site of the well.

4. The method according to claim 2, wherein the step of forming or providing a water-based well fluid comprises:
   (a) forming or providing a first fluid comprising:
      (i) water; and
      (ii) cellulose nanowhiskers;
   (b) forming or providing the water-based well fluid comprising the first fluid.

5. The method according to claim 4, wherein the step of forming or providing the water-based well fluid comprising the first fluid is performed at the well site of the well.

6. The method according to claim 2, wherein the water-based well fluid is adapted and the step of introducing is under conditions adapted for use in a well service selected from the group consisting of drilling, cementing, completion, and intervention.

7. The method according to claim 2, wherein the water-based well fluid is adapted and the step of introducing is under conditions adapted for use in drilling of the well.

8. The method according to claim 2, wherein the water-based well fluid is adapted and the step of introducing is under conditions adapted for use in cementing of a portion of the well.

9. The method according to claim 2, wherein the water-based well fluid is adapted and the step of introducing is under conditions adapted for use as a kill pill in the well.

10. The method according to claim 2, wherein the water-based well fluid is adapted and the step of introducing is under conditions adapted for use in hydraulic fracturing of a zone of the well.

11. The method according to claim 2, wherein the water-based well fluid is adapted and the step of introducing is under conditions adapted for use in stabilizing the wellbore and controlling fluid loss to the formation or fluid invasion from the formation.

12. The method according to claim 2, wherein the cellulose nanowhiskers have a temperature stability of at least 350° F. and the design temperature of the step of introducing is not greater than the temperature stability of the nanowhiskers.

13. The method according to claim 2, wherein the cellulose nanowhiskers are prepared using HCl.

14. The method according to claim 2, wherein the cellulose nanowhiskers are prepared using less than the concentration of $H_2SO_4$ that would have a deleterious effect on the thermal stability of the cellulose nanowhiskers compared to cellulose nanowhiskers prepared using HCl.

15. The method according to claim 2, wherein the water of the water-based well fluid is a brine.

16. The method according to claim 2, wherein the water of the water-based well fluid is a formate brine.

17. The method according to claim 2, wherein the cellulose nanowhiskers are chemically substituted with an organic compound or grafted with a polymer.

18. The method according to claim 17, wherein the cellulose nanowhiskers are adapted to be capable of being crosslinked, either prior to the step of introducing or thereafter in-situ in the well.

19. The method according to claim 18, wherein the cellulose nanowhiskers are crosslinked prior to the step of introducing.

20. The method according to claim 19, wherein the crosslinking of the cellulose nanowhiskers is broken after the step of introducing into the well before a step of flowing back from the well.

21. The method according to claim 2, wherein the water-based well fluid does not include particulate larger than the cellulose nanowhiskers.

* * * * *